United States Patent [19]

Locacius et al.

[11] Patent Number: 4,705,278

[45] Date of Patent: Nov. 10, 1987

[54] SELECTIVELY COMPRESSED EXPANDED GRAPHITE GASKET AND METHOD OF MAKING SAME

[75] Inventors: Robert F. Locacius, Lake Zurich; Terence Zelenka, Chicago, both of Ill.

[73] Assignee: Fel-Pro Incorporated, Skokie, Ill.

[21] Appl. No.: 912,593

[22] Filed: Sep. 29, 1986

[51] Int. Cl.⁴ ............................................. F16J 15/12
[52] U.S. Cl. .................................. 277/235 B; 277/166; 277/DIG. 6; 277/1
[58] Field of Search ........... 277/166, 233, 234, 235 R, 277/235 A, 235 B, DIG. 6

[56] References Cited

U.S. PATENT DOCUMENTS

| | | | |
|---|---|---|---|
| 2,809,853 | 10/1957 | Nathan | 277/205 |
| 3,565,449 | 2/1971 | Ascencio | 277/235 R |
| 3,841,289 | 10/1974 | Meyers | 277/235 B X |
| 4,083,570 | 4/1978 | Sugawara | 277/235 B |
| 4,333,975 | 6/1982 | Booth | 277/235 B X |
| 4,465,287 | 8/1984 | Bindel et al. | 277/235 B |

FOREIGN PATENT DOCUMENTS 2124309  2/1984  United Kingdom ........... 277/235 B

OTHER PUBLICATIONS

Ishino Gasket Mfg. Co., Ltd.-"High Heat-Resistant Composite Gasket", Brochure, 4 pages, No date.

Primary Examiner—Robert S. Ward
Attorney, Agent, or Firm—Dressler, Goldsmith, Shore, Sutker & Milnamow, Ltd.

[57] ABSTRACT

A laminated expanded graphite gasket, such as an automotive head gasket, comprising a core and compressed expanded graphite facings and defining clear-through openings. A thin metallic layer is positioned on the graphite facing over less than 75% of the area of the facing for at least partial embeddment therein to enhance sealing stress in the covered portions, to improve impingment resistance of the gasket, and to improve other properties of expanded graphite gaskets.

23 Claims, 8 Drawing Figures

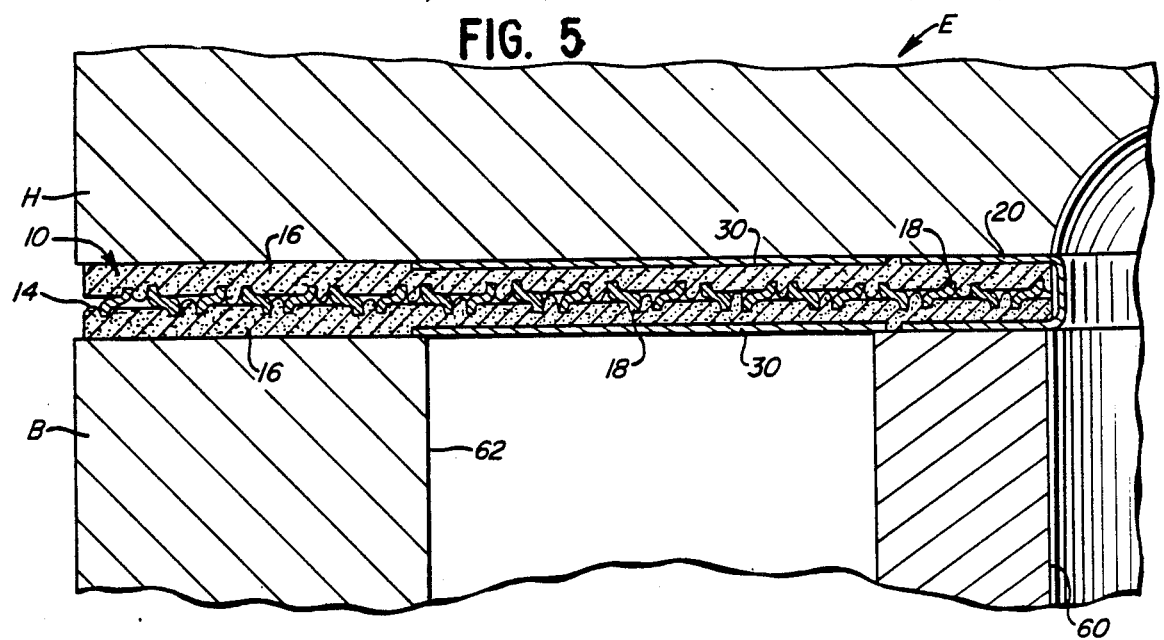
FIG. 5
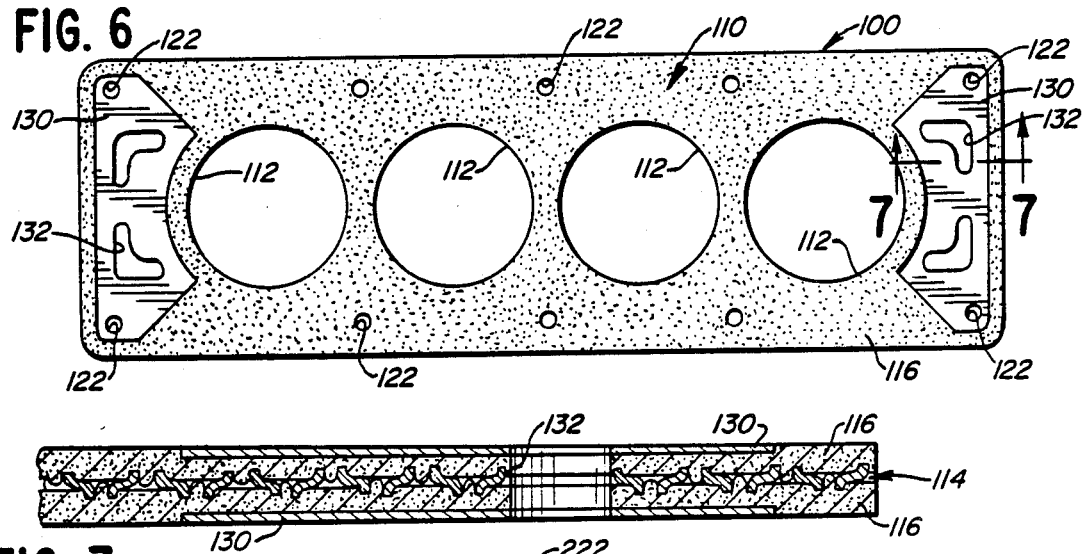
FIG. 6
FIG. 7
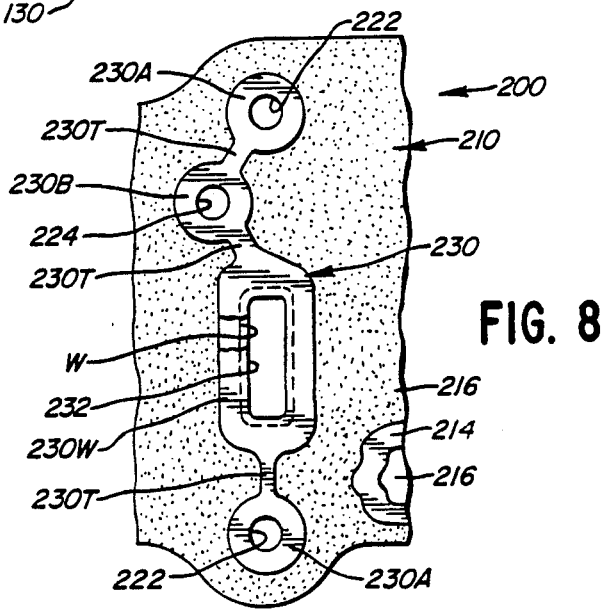
FIG. 8

SELECTIVELY COMPRESSED EXPANDED GRAPHITE GASKET AND METHOD OF MAKING SAME

BACKGROUND OF THE INVENTION

Gaskets comprising laminations of compressed expanded graphite facings and metal cores are known, as well as such gaskets with foil completely overlying the graphite facings. Such gaskets, include those having graphite facings sandwiching a metal core, are used for a wide variety of purposes, especially where high temperature is a consideration, such as for head gaskets, exhaust system gaskets and the like.

Although the temperature resistance and resilience at higher densities of compressed expanded graphite is quite good, certain of the other properties and characteristics of compressed expanded graphite are less than desirable. For example, when graphite is used in a head gasket the graphite tends to erode at high pressure oil openings and at metered coolant openings, tending to destroy the sealing characteristics of the expanded graphite. When the graphite is subjected to repeated minute movements, as the surfaces of head gaskets typically are in service usage, the surface tends to abrade, gradually affecting the sealing characteristics of the gasket. Further, graphite tends to stick to confronting engine parts which is a drawback when the gasket is to be removed for servicing of the engine or replacement of the gasket.

It would therefore be desirable to provide an improved expanded graphite gasket which would alleviate or avoid some or all of the drawbacks of prior art expanded graphite laminated gaskets, and which would provide other advantages as well.

SUMMARY OF THE INVENTION

In accordance with the present invention an improved expanded graphite gasket, having improved sealing characteristics is provided. The gasket comprises an expansive laminate of a thin self-supporting core having a pair of main faces and a generally coextensive compressed expanded graphite facing laminated to at least one, and preferably to each, main faces. The gasket assembly defines at least one opening therethrough.

A thin protective metallic layer at least partially embedded in at least one of the facings is provided and covers portions of the facing which comprises less than 75% of the surface areas of the facing, and most preferably less than 50% of the surface areas of the facing. As such the density of the graphite facing in the covered portion is greater than the density outside the covered portion and the sealing stress of the gasket in use is greater in the covered portion than outside the covered portion.

In a preferred form the core is a metallic core, a metallic layer is embedded in each of the facings and the metallic layers are in vertical alignment.

The facings are preferably adhesively or otherwise secured to the core. Desirably the core may be a tanged metallic core which serves also to resist lateral movement of the metallic layers. Resistance to lateral movement may also be assisted by securing the metallic layers adhesively to the graphite facings.

The density of the graphite facings is desirably at least 70 pounds per cubic foot outside the covered portions and is substantially greater in the covered portions.

In a preferred embodiment the gasket assembly is an automotive head gasket defining at least one combustion opening and a plurality of further openings, the metallic layer is embedded in each facing and surrounds each of the combustion openings and a plurality of further openings, at least some of the metallic layers are in vertical alignment, and the densities of the facings are in excess of 70 pounds per cubic foot outside the covered portions and greater than that in the covered portions when in the compressed condition.

The method of forming a graphite faced gasket of the present invention which has zones of different facing densities comprises the steps of forming a laminate comprising a thin self-supporting core having a pair of main faces and a generally coextensive compressed expanded graphite facing laminated to one and preferably to each main face, providing at least one opening therethrough, providing a thin, protective metallic layer on the surface of at least one facing to cover portions of the facing over less than 75% of the surface area of the facing, and embedding the metallic layer in the facing, whereby the density of the graphite facing in the metallic covered portions is greater than outside the covered portions and the sealing stress of the gasket assembly in use is greater in the covered portions than outside the covered portions when in the compressed condition.

In more preferred forms, the method comprises forming a metallic pattern and then applying the pattern to the facing. Desirably the pattern is integrally formed and then applied to the facing. Preferably the step of providing a protective metallic layer comprises providing a layer on each graphite facing, but over less than 50% of the surface area of the facings. Desirably the protective metallic layers are provided in vertical alignment on the facings.

Further objects, features, and advantages of the present invention will become apparent from the following description and drawings.

BRIEF DESCRIPTION OF THE DRAWINGS

FIG. 5 is an enlarged fragmentary cross-sectional view taken substantially along line 5—5 of FIG. 4;

FIG. 6 is a plan view of a further gasket of the present invention;

FIG. 7 is an enlarged cross-sectional view taken substantially along line 7—7 of FIG. 6; and FIG. 8 is a fragmentary, schematic view of another embodiment of the present invention.

DETAILED DESCRIPTION OF THE PREFERRED EMBODIMENTS

Figure 1:
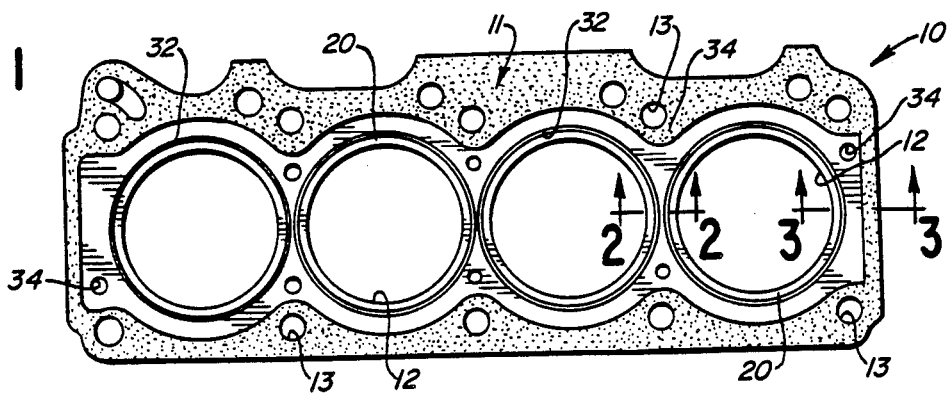
FIG. 1 is a plan view of a compressed, expanded graphite gasket assembly incorporating the principles of the present invention.
Figure 2:
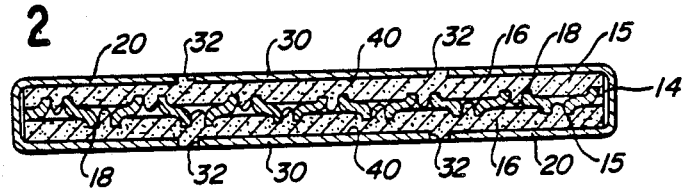
FIG. 2 is an enlarged cross-sectional view taken substantially along line 2—3 of FIG. 1.
Figure 3:
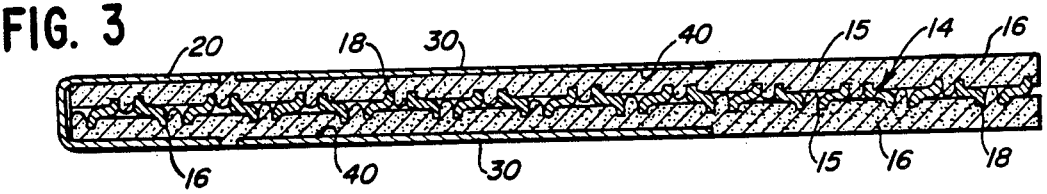
FIG. 3 is an enlarged cross-sectional view taken substantially along line 3—3 of FIG. 1.

First referring to FIGS. 1-5, a laminated head gasket assembly made in accordance with the present invention is shown in juxtaposition with a portion of an engine block for which it is designed for use.

Gasket assembly 10 comprises a generally flat main body 11 formed from a central core and a pair of graphite facings, and defining a plurality of openings, including combustion openings 12 and bolt holes 13. The main body comprises a thin central, self-supporting metallic core 14 having a pair of main faces 15, and a pair of compressed expanded graphite facings 16 laminated to faces 15. The core may be conventionally tanged, as with tangs 18, to facilitate the assembly of the core and facings into a unitary laminated assembly. Alternatively the facings 16 and core 14 may be adhesively secured and the core may be non-tanged or plain surfaced, i.e., a solid core. The gasket assembly also provides armoring at the combustion openings 12. The armoring may take the known form of generally U-shaped metallic rings 20. So far the gasket assembly comports with known gasket assemblies.

The main body of the gasket is additionally provided with an inlaid pattern in desired locations. In a presently preferred embodiment the inlaid pattern takes the form of a protective thin metallic layer 30 such as a foil of aluminum disposed on the surface of one or both facings 16 which is located in desired selected locations for particular purposes, and which covers portions of the expanded graphite facings 16. Where there is a covering layer 30 on each face 15, they are preferably in vertical alignment.

As shown in FIGS. 1-5, the foil pattern 30 is embedded fully, and is therefore fully inlaid, in the gasket body, and its upper surface is therefore substantially flush with the uncovered, unpatterned portion of the graphite facings 16 of the main body 11. Thus the layer 30 comprises a pattern defining at least one, and most usually a plurality of openings such as generally circular openings 32, for surrounding the combustion openings 12.

Figure 4:
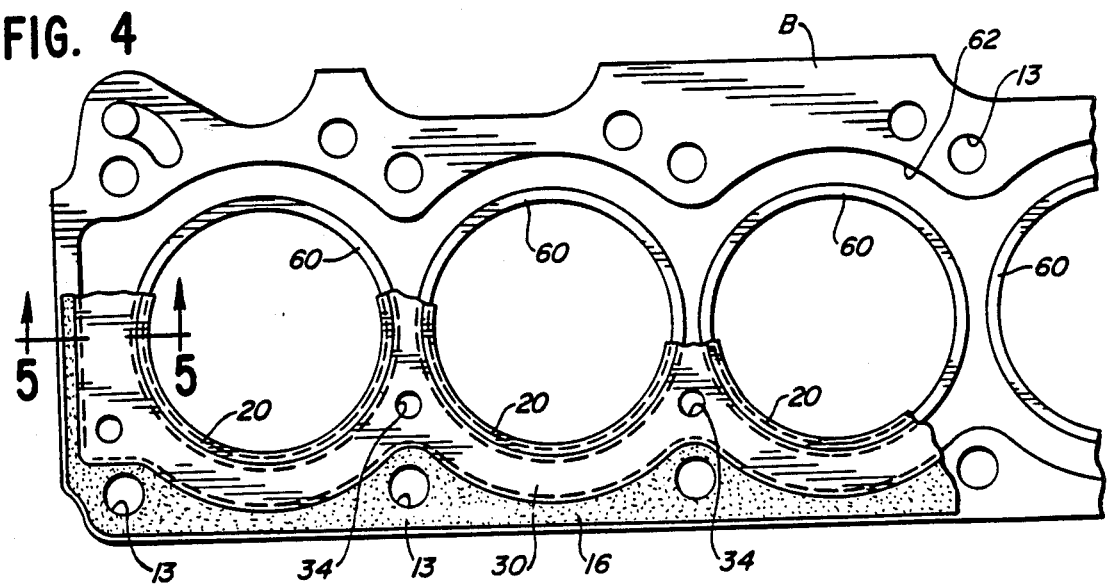
FIG. 4 schematically illustrates a portion of an engine block juxtaposed with the gasket of FIG. 1.

Referring now to FIGS. 4 and 5, the block B of engine E shows a plurality of cylinders 60 which are surrounded by a coolant chamber 62. A head H superposes the gasket assembly 10 and block B. In the embodiment of FIGS. 1-5, the gasket assembly 10 is shown as being designed for use with an "open-deck" engine E. As such, as shown, the metallic layers 30 confront and overlie the coolant chamber 62 (see FIG. 5). Additionally, the pattern defines a series of much smaller apertures 34. These meter coolant from the block to aligned head bore-like passageways in a known manner.

Although the layers 30 are at least partially embedded in the graphite facings which serves to locate the layers relative to the remainder of the gasket assembly 10, it is desirable further to secure the layers against lateral movement in use. Thus, the layers 30 may be provided with a thin, self-adhering backing layer 40 for adhesively securing same to the graphite facings 16. Alternatively, where the core is tanged, the tangs 18 tend to produce a slight embossment on the surface of the graphite facings 16 which produces a pattern which tends to resist lateral movement of the layers 30 relative to the graphite facings 16 in use.

In a typical gasket assembly 10 in accordance with the present invention, the main body comprises a core 14, as of cold rolled steel with a tanged pattern. The core, prior to tang formation, is about 0.008 inch thick. The compressed expanded graphite facings 16 comprise sheets of compressed expanded graphite which, after assembly with the core 14, are each about 0.025 inch thick and are each of a density of about 70 pounds per cubic foot. Other thicknesses of each and density of graphite may be used as desired. Preferably, to conserve material, the graphite facings 16 are formed in the pattern shown, with the zones of the combustion openings free of graphite, for assembly with the core. Alternatively, a core-facing laminate may be formed, which may thereafter be die-cut or blanked out to provide the openings in the main body.

A suitable compressed flexible, expanded graphite material is available from Calcarbon, a division of Polycarbon, Inc. under the name Calgraph A. A typical Calgraph A comprises a minimum of about 98% graphite and about 2% ash maximum at 950° C. (ASTM C-561) and has a density of about 70 pounds per cubic foot. The material is essentially devoid of binders, resins, fillers and additives. A like material is said by Union Carbide Corporation to be made in accordance with U.S. Pat. No. 3,404,061. Such materials may be formed into sheets, and then die-cut into the desired shape and then further compressed, if desired. Thus 70 pound per cubic foot sheet material may be cut into suitable gasket shapes for assembly with the core later to be further compressed, if desired, or expanded graphite may be formed into the sheet pattern of the drawings and then laminated with the core.

After the main body 11, the core-facings assembly, have been assembled, the metallic patterns, the layers 30 which have been suitably formed, as by die-cutting, from a sheet of foil, such as 0.003 inch aluminum foil having a self-adhering adhesive layer 40, are juxtaposed and applied, usually in vertical alignment especially if the patterns are the same, with the opposite surfaces of the main body of the gasket assembly, and are laminated thereto, embedding the foils, such as to positions in which they are substantially flush with the surfaces of the compressed expanded graphite facings.

To produce the best results, the protective metallic layers cover portions of the facings which are less than 75% of the surface area of the facing (leaving at least 25% exposed) and most preferably cover portions of the facings which are less than 50% of the facing surface area (leaving at least 50% exposed).

As will be apparent, the graphite therefore becomes more densified in the zones of the foil. That increased density will serve to increase the unit sealing stress of the gasket assembly in the zone of the covered portions of the facings, i.e., in the zone of the foil pattern, as compared to the sealing stress in the facings outside the covered portions, thereby enhancing the sealing characteristics thereat.

Further, because the protective foil surrounds and overlies the coolant zone in the block and is disposed in the zone of the coolant passageways in the head, the foil will protect the graphite facings from erosion by the coolant. Additionally, in the zones of the foil 30, the foil serves to protect the graphite facings 16 from erosion and abrasion due to the minute relative movement of the head with respect to the block. This helps preserve the sealing characteristics of the gasket assembly and to prolong its life. The metallic core and metallic layers 30 also act as heat sinks to transfer heat and to contribute to a cooler running engine.

FIGS. 6 and 7 illustrate another application of the present invention. As there shown the head gasket assembly 100 comprises a laminated main body 110 having a metallic core 114 and a pair of compressed expanded graphite facings 116. The core may be tanged to enhance the integrity of the lamination. The main body 110 defines a plurality of combustion openings 112 which may be armored (not shown) and a plurality of bolt holes 122. The general construction of the gasket assembly may be similar to that of FIG. 1, and as such the thicknesses of the components of the gasket assembly 100 and the densities of the graphite facings 116 may be like those of gasket assembly 10.

Each end of the gasket assembly 100 is provided with a metallic protective layer or pattern 130, as of aluminum foil, on each main surface of the graphite facings 116. As there shown, patterns 130 each comprise a main body which is positioned between the end of the gasket and the first combustion opening 112. Patterns 130 define a plurality of openings, such as bolt hole openings 122 and coolant openings 132. The function of the foil patterns 130 in terms of improving gasket performance is similar to that of gasket assembly 10. Additionally, the foil 130, being located at the ends of the gasket assembly, when in service will produce additional loading at the ends, thereby to reduce engine head bending, which in turn will promote more uniform sealing stresses across the entire width of the gasket assembly 100.

FIG. 8 schematically illustrates a fragment of a head gasket assembly 200 comprising a main body 210. Main body 210 comprises a core 214, which may be tanged, and compressed expanded graphite facings 216. The core and facing dimensions and construction of the components of main body of the gasket may be like that of gasket assembly 10, although of course the shape, hole arrangement, and the like may differ with the application. The main body 210 defines a plurality of openings, including bolt holes 222, an oil hole 224, and a coolant opening 232. A foil pattern 230, which may also be referred to as a lace, is provided, and includes portions 230A which surround the bolt holes 222, portion 230B which surrounds the oil hole 224, and portion 230W which surrounds coolant opening 232. The several portions 230A, 230B and 230W may be interconnected, as by connecting tabs 230T.

As shown in dotted line in FIG. 8, the coolant opening 232 is a metering opening, i.e., is smaller than the opening W in the head or block with which the gasket 200 is to be used. Thus, the portion 230W is directly impinged upon by the coolant and protects against impingement directly against the graphite facings by the coolant. Such impingement normally tends to erode graphite facings and eventually to impair the sealing characteristics of the gasket.

Thus, not only does the lace pattern 230 protect against coolant impingement, but it also provides enhanced protection around the oil opening. By increasing the sealing stress at the bolt holes, it tends to reduce bending and torque loss.

Thus, the application of the foil lace at locations and zones where additional protection or sealing stress is desired, rather than across the entire face of the gasket, provides a series of advantages, including a simple and positive means for selectively providing for additional loading where such may be desired or necessary.

The metallic layers in the embodiments illustrated have been shown as integrally formed. It is apparent that they may be segmental for application in selected locations and that they may indeed be of different or plural thicknesses. They may be differently located on opposite facings. They provide an array of possibilities in enhancing the efficacy of graphite facings for gaskets.

Although the invention has been illustrated with regard to automotive head gaskets, it will be apparent that it may be used in a wide variety of applications where compressed expanded graphite is currently being used as well as in environments where it cannot presently be used or is not presently used because of the limitations inherant in its properties. Thus, other high temperature automotive applications, where temperatures of at least 225° F. are the common service temperature, include exhaust system gaskets which commonly encounter temperatures as high as 1000° F., EGR gaskets which commonly encounter temperatures as high as 700° F., and throttle body gaskets which commonly encounter temperatures of at least 225° F. A variety of non-automotive uses may be made of the invention as well, such as with fluid seals in which a lace with bolt surrounds may be used to minimize flange distortion, etc.

Although but several embodiments of the invention have been shown and described, it is to be understood that the various modifications and substitutions may be made by those skilled in the art without departing from the novel spirit and scope of the invention, and accordingly the invention is intended to embrace all modifications within the scope of the appended claims.

What is claimed is:

1. A laminated, selectively compressed, expanded graphite gasket assembly comprising:
    a thin self-supporting core having a pair of main faces and generally coextensive compressed expanded graphite facings of generally uniform thickness, one laminated to each main face, said gasket assembly defining at least one opening therethrough,
    a flat protective thin metallic layer at least partially embedded in at least one of said facing and covering portions of said facing which are less than 75% of the surface area of said facing, whereby the density of said graphite facing in the covered portions is greater than the density outside the covered portions and the sealing stress of said gasket assembly in use is greater in the covered portions than outside the covered portions.

2. A gasket assembly in accordance with claim 1, and wherein said core is a metallic core and a metallic layer is embedded in each of said facings.

3. A gasket assembly in accordance with claim 2, and wherein said metallic layers are in vertical alignment.

4. A gasket assembly in accordance with claim 1, and wherein said metallic layer surrounds at least one opening.

5. A gasket assembly in accordance with claim 1, and wherein core is a tanged metallic core.

6. A gasket assembly in accordance with claim 2, and wherein said metallic layers comprise self-adhering metallic foil patterns adhesively secured to said graphite facings.

7. A gasket assembly in accordance with claim 1, and wherein the density of said facings is at least 70 pounds per cubic foot outside said covered portions and is substantially greater in said covered portions.

8. A gasket assembly in accordance with claim 1, and wherein said covered portions comprise less than 50% of the surface area of said facing.

9. A gasket assembly in accordance with claim 1, and wherein said assembly is an automotive head gasket defining at least one combustion opening and a plurality of further openings, and wherein said metallic layer is embedded in each facing and surrounds, but is spaced away from, each combustion openings, and surrounds a plurality of further openings, at least some portions of the metallic layers being in vertical alignment, the densities of the facings being in excess of 70 pounds per cubic foot outside the covered portions and greater in the covered portions.

10. A gasket assembly comprising:
an expansive, thin self-supporting core defining a pair of main faces, and a compressed expanded graphite facing laminated to at least one of said main faces to provide a main gasket body,
at least two openings defined by said main gasket body.
a flat thin protective layer covering portions of said facing comprising less than 75% of the surface area of said expanded graphite facing and surrounding at least two openings defined by said main body,
said thin protective layer being at least partially embedded in said facing and providing a density in the covered portions of said graphite facing which is greater than the density outside the covered portions of said facing.

11. A gasket assembly in accordance with claim 10, and wherein said core is a metallic core, a facing is laminated to each main face, and a metallic layer is embedded in each of said facings.

12. A gasket assembly in accordance with claim 11, and wherein said metallic layers are in vertical alignment.

13. A gasket assembly in accordance with claim 11, and wherein said layers comprise self-adhering metallic foil patterns adhesively secured to said graphite facings.

14. A gasket assembly in accordance with claim 10, and wherein the density of said facings is at least 70 pounds per cubic foot outside said covered portions and is substantially greater in said covered portions.

15. A gasket assembly in accordance with claim 11, and wherein said covered portions comprise less than 50% of the surface areas of said facings.

16. A gasket assembly in accordance with claim 10, and wherein said gasket assembly is an automotive head gasket defining at least one combustion opening and a plurality of further openings, and wherein said metallic layer is embedded in each facing and said layers surround, but is spaced away from, each of the combustion openings, and surrounds a plurality of further openings, at least some portions of the metallic layers being in vertical alignment, the densities of the facing layers being in excess of 70 pounds per cubic foot outside the covered portions and greater in the covered portions.

17. A method of forming a graphite faced gasket having zones of different facing densities comprising the steps of
forming a laminate comprising a thin self-supporting core having a pair of main faces and a generally coextensive compressed expanded graphite facing of generally uniform thickness laminated to at least one main face,
providing at least one opening therethrough,
providing a thin, generally flat protective metallic layer on the surface of at least one facing to cover portions of said facing over less than 75% of the surface area of said facing,
and embedding said layer in said facing to reduce the thickness of the facing in the zone of said layer whereby the density of the graphite facing in the covered portions is greater than outside the covered portions and the sealing stress of the gasket assembly in use is greater in the covered portions than outside the covered portions.

18. The method in accordance with claim 17, and wherein the step of providing the protective metallic layer comprises forming a metallic pattern and then applying said pattern to said facing.

19. The method in accordance with claim 18, and wherein said pattern is integrally formed and then applied to said facing.

20. The method in accordance with claim 17 and comprising the step of providing a protective metallic layer on each graphite facing over less than 50% of the surface area of said facings.

21. The method in accordance with claim 17, comprising the step of providing graphite facings on both main faces and providing said protective metallic layers in vertical alignment on said facings.

22. The method in accordance with claim 17, and wherein the step of providing the metallic layer comprises adhesively securing same to the surface of said facing.

23. The method in accordance with claim 22, and wherein the step of adhesively securing comprises providing said metallic layer as a self-adhering metallic foil, and adhering said foil to the surface of said facing.

* * * * *